(12) United States Patent
Maltseff et al.

(10) Patent No.: US 9,779,274 B2
(45) Date of Patent: *Oct. 3, 2017

(54) RFID TAGS WITH CDMA COMMUNICATION CAPABILITIES

(71) Applicant: INTERMEC IP CORP., Everett, WA (US)

(72) Inventors: Paul A. Maltseff, Woodinville, WA (US); Ronald D. Payne, Bothell, WA (US)

(73) Assignee: INTERMEC IP CORP., Lynnwood, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,467

(22) Filed: Jun. 13, 2014

(65) Prior Publication Data

US 2014/0292491 A1   Oct. 2, 2014

Related U.S. Application Data

(63) Continuation of application No. 12/446,439, filed as application No. PCT/US2007/065875 on Apr. 3, 2007, now Pat. No. 8,754,749.

(60) Provisional application No. 60/841,775, filed on Sep. 1, 2006.

(51) Int. Cl.
   *G06K 7/10*      (2006.01)
   *G06K 19/07*     (2006.01)
   *G06K 7/00*      (2006.01)

(52) U.S. Cl.
   CPC ....... *G06K 7/10366* (2013.01); *G06K 7/0008* (2013.01); *G06K 19/0723* (2013.01)

(58) Field of Classification Search
   CPC ............ G06K 7/0008; G06K 7/10366; G06K 19/0723

See application file for complete search history.

(56) References Cited

U.S. PATENT DOCUMENTS

| 4,442,527 | A | | 4/1984 | Munday |
| 5,077,753 | A | * | 12/1991 | Grau et al. .................... 375/141 |
| 5,940,006 | A | | 8/1999 | MacLellan et al. |
| 6,115,426 | A | | 9/2000 | Fujimoto et al. |
| 6,127,917 | A | | 10/2000 | Tuttle |
| 6,172,609 | B1 | * | 1/2001 | Lu ........................ G06K 7/0008 340/10.4 |
| 6,177,861 | B1 | | 1/2001 | MacLellan et al. |

(Continued)

OTHER PUBLICATIONS

Digitalradiotech.co.uk, "Coded Orthogonal Frequency Division Multiplexing (COFDM)," http://www.digitalradiotech.co.uk. cofdm.htm, accessed Apr. 2, 2007, 20 pages.

(Continued)

*Primary Examiner* — Yong Hang Jiang
(74) *Attorney, Agent, or Firm* — Oliff PLC; R. Brian Drozd (57) ABSTRACT

An apparatus for use in an RFID data collection system includes an antenna portion for wirelessly exchanging signals and a memory portion for storing RFID data. A signal processing portion is coupled among the antenna portion and the memory portion. The signal processing portion is configured to receive RFID data and to at least encode or decode the received RFID data via at least one spreading code, such as a mutually orthogonal code. Other configurations are also disclosed.

16 Claims, 5 Drawing Sheets

(56) References Cited

U.S. PATENT DOCUMENTS

| | | | |
|---|---|---|---|
| 6,384,712 | B1 | 5/2002 | Goldman et al. |
| 6,456,858 | B1* | 9/2002 | Streter .................. 455/552.1 |
| 6,865,237 | B1 | 3/2005 | Boariu et al. |
| 7,019,639 | B2 | 3/2006 | Stilp |
| 7,023,817 | B2* | 4/2006 | Kuffner et al. ............ 370/324 |
| 7,242,293 | B2 | 7/2007 | Rea et al. |
| 7,359,466 | B2 | 4/2008 | Huang et al. |
| 7,398,932 | B2 | 7/2008 | Ashili et al. |
| 7,423,961 | B2 | 9/2008 | Ogawa et al. |
| 7,599,325 | B2 | 10/2009 | Lin et al. |
| 7,609,780 | B2 | 10/2009 | Sadowsky |
| 7,693,111 | B2 | 4/2010 | Sondur et al. |
| 7,756,548 | B2 | 7/2010 | Laroia et al. |
| 7,804,907 | B2 | 9/2010 | Nagai |
| 8,315,191 | B2 | 11/2012 | Glazko et al. |
| 2004/0179588 | A1 | 9/2004 | Kuffner et al. |
| 2005/0237184 | A1 | 10/2005 | Muirhead |
| 2006/0045194 | A1 | 3/2006 | Athanasios et al. |
| 2006/0071807 | A1* | 4/2006 | Sadowsky ............ H04B 7/0617 340/13.24 |
| 2007/0059901 | A1 | 3/2007 | Majumdar et al. |
| 2007/0126585 | A1 | 6/2007 | Okunev et al. |
| 2007/0222560 | A1* | 9/2007 | Posamentier ........ G06K 7/0008 340/10.2 |
| 2007/0229261 | A1 | 10/2007 | Zimmerman et al. |
| 2007/0296583 | A1* | 12/2007 | Rofougaran ............... 340/572.1 |
| 2008/0113632 | A1 | 5/2008 | Chae et al. |
| 2010/0060424 | A1* | 3/2010 | Wild .................. G01S 13/751 340/10.1 |
| 2010/0271179 | A1 | 10/2010 | Maltseff |
| 2010/0277318 | A1 | 11/2010 | Maltseff |

OTHER PUBLICATIONS

Edfors et al; "An Introduction to Orthogonal Frequency-Division Multiplexing;" Sep. 1996; 58 pages.

Shi et al; "Channel-Eigenvector Invariant Space Time Constellations;" UCLA; 2004; 5 pages.

Alamouti; "A Simple Transmit Diversity Technique for Wireless Communication;" IEEE Journal on Select Areas in Communication; Col. 16; No. 8; Oct. 1998; 7 pages.

Chang et al; "An Insight into space-time block codes using Hurwitz-Radon families of matrices;" Signal Process; 2008; 33 pages.

Gesbert et al; "Breaking the barriers of Shannon's capacity: An overview of MIMO wireless systems;" Telenor's Journal: Telektonikk, Department of Informatics; University of Oslo, Norway; 2002; 9 pages.

HP News Release; "HP Unveils Revolutionary Wireless Chip that Links the Digital and Physical Worlds;" http://www.hp.com/hpinfo/newsroom/press/2006/060717a.html; Palo Alto, California; Jul. 17, 2006; 2 pages.

Jul. 7, 2008 Search Report issued in International Patent Application No. PCT/US07/65875.

Jul. 7, 2008 Written Opinion issued in International Patent Application No. PCT/US07/65875.

* cited by examiner

RFID TAGS WITH CDMA COMMUNICATION CAPABILITIES

CROSS-REFERENCE TO RELATED APPLICATIONS

This is a Continuation of Application Ser. No. 12/446,439 filed Apr. 21, 2010, which in turn is a U.S. National Phase application of International Application Serial No. PCT/US2007/065875, filed on Apr. 3, 2007, which claims the benefit of U.S. Provisional Application No. 60/841,775 filed Sep. 1, 2006. The disclosure of the prior applications is hereby incorporated by reference herein in its entirety.

BACKGROUND

RFID (radio frequency identification) technology has gained momentum in the last decade as a solution for tracking resources in supply chain logistics. The ever increasing demands for data have drawn the attention to the search of new approaches for communication between RFID tags and. readers to decrease the communication time between every particular tag and reader. For example, Hewlett Packard Corp. has unveiled a new wireless chip capable to communicate with the speed up to 10 Megabits per second. See, *HP Unveils Revolutionary Wireless Chip that Links the Digital and Physical Worlds—Grain-sized chip could be attached to almost any object, making information more ubiquitous*, HP Press Release from Jul 17, 2006. However, the communication distance for this device is limited to a few inches due to the employment of inductive coupling for harvesting energy and communication.

DETAILED DESCRIPTION

Benefits in RFID technology can be realized by employing multiplexing, spread-spectrum and other communication techniques described herein to increase the communication range and robustness with RFID tags, while decreasing communication time so that more tags can be read within a given period of time. By using, for example, multiplexing communication techniques at the tag, and employing more sophisticated processing at the RFID reader, these and other benefits may be realized with R"FID data collection. Briefly, and in general terms, aspects of the present invention provide a new approach for communications between RFID tags and readers based on the application of CDMA paradigms for communications between tags and readers, including using multiple antennas. As a result, a reader can read multiple tags simultaneously, with each tag having a different, mutually orthogonal code. (While the terms "CDMA communications", "CDMA techniques", and the like are used below, they generally relate to the use of spread spectrum communications, but not necessarily using orthogonal codes.)

Various embodiments or examples of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Figure 1:
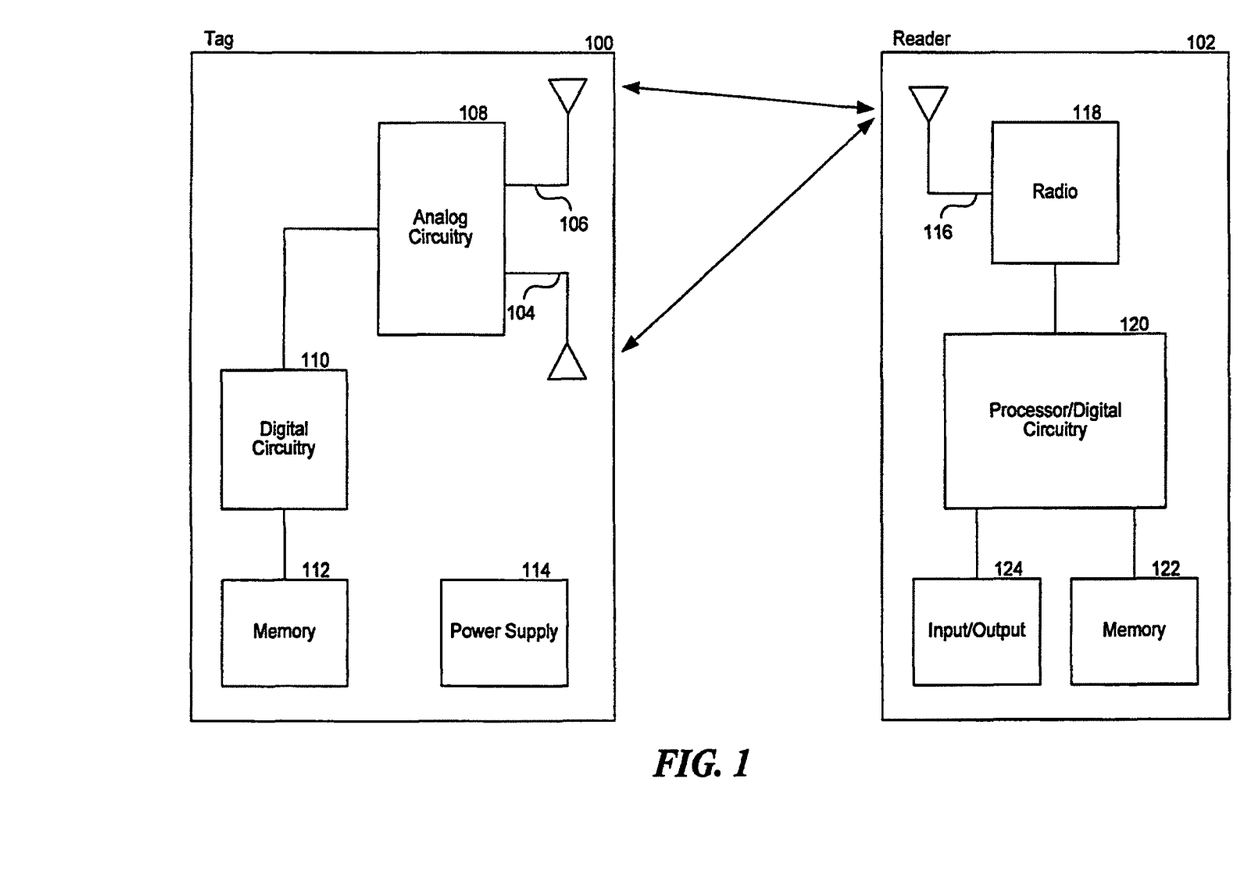
FIG. 1 is a block diagram showing an example of a RFID tag and associated reader employing aspects of the invention.

Referring to FIG. 1, an example of an RFID tag 100 and reader 102 is shown. The tag 100 includes two tag antennas 104 which receive signals from and transmit signals to the reader 102. The antennas may be formed on a substrate for the tag, and be of any known form. For example, each antenna may be tuned to a different frequency. Tag analog circuitry 108, coupled to the tag antennas, provides for data transfer with the reader by modulating a signal for transmission and receiving signals from the reader. Digital circuitry 110, coupled to the tag analog circuitry, can be of many types, including dedicated logic devices, gate arrays, a microprocessor, or other digital signal processing circuitry, together with any necessary software/firmware. The digital circuitry communicates with memory 112, which can be of any form, such as read-only memory (ROM), random access memory (RAM), non-volatile memory such as EEPROM, Flash, etc. The memory may store one or more spreading codes or chip sequences to spread transmitted data signals, or even store orthogonal codes to uniquely identify one or more channel codes associated with the tag. The analog circuitry 108, digital circuitry 110 and memory 112 may be formed on a single semiconductor chip or device.

A power supply 114 defines a type of tag. For example, the power supply can be a battery, making the tag 100 an active tag. Alternatively, the power supply can be energy storage circuitry to permit the tag to passively harvest and store electromagnetic energy received from the reader 102. The tag 100 can also be a hybrid tag that employs both passive and active features.

The reader 102 includes an antenna 116 coupled to a radio 118. A memory 122 of the reader 102 stores data received from the tag, as well as instructions for operating the reader. A processor or digital circuitry 120 communicates with the radio to provide appropriate signals to the tag 100, and receive data therefrom. For example, as described herein, the processor/digital circuitry 120 may include a despreader and detector or decoder (or associated software or firmware to perform detector/decoding functions) so as to process received CDMA signals from the tag 100. The reader may employ any known receiver and decoder, such as a maximum likelihood detector, Viterbi decoder, feedback decoder, block/convolutional decoder, de-interleaver, and other known detectors/decoders, as well as any receiver, such as a rake receiver that employs multiple correlators. If, for example, the system employs direct sequence spread spectrum (DSSS) techniques, then the reader may process (e.g. XOR) the received spread spectrum signal with one or more locally stored/generated chipping sequence(s) (e.g. orthogonal code(s)), and then employ an integrator/correlator with a decision unit to retrieve the transmitted tag data.

Since RFID readers may employ synchronization under existing RFID technology, synchronization with tags employing CDMA communications can be readily implemented. Overall, the reader may be considerably more sophisticated in terms of processing capabilities (signal reception and decoding) as compared to the tags, which may be designed with much simpler data processing capabilities.

The reader 102 may employ input/output circuitry 124, which can be any of a variety of devices or circuitry. For example, the reader may include a trigger or button when employed as a hand-held reader (often with a portable power source), as well as include a display, speakers and/or output port for wired connection with an external computer or network. Alternatively, the reader could include any of a variety of sensors to cause the reader to automatically enter a reading or interrogation mode based on a signal from one or more sensors.

The reader 102 can, of course, be of any possible configuration known in the RFID field. The reader may also employ CDMA encoding circuitry or instructions to encode and transmit data using CDMA encoding to tags or external receivers. While the system of FIG. 1 is shown with a tag having two antennas and a reader having a single antenna, other alternatives are possible, so long as the tag or the reader employ code division multiplexing or spread spectrum transmissions, such as using encoding using orthogonal or spreading codes. In other words, the system uses spreading sequences (e.g., pseudo-random codes) for the tags/reader to provide spread-spectrum communications, where the modulated coded signal has a much higher bandwidth than the data being communicated.

In operation, the tag 100 can operate normally using existing RFID standards, but can also operate under an alternative communication node employing CDMA coding, as described herein. Thus, the tag can provide an initial communication to the reader indicating that the tag is capable of CDMA communications, and thus the reader can begin using CDMA communication techniques with the tag (e.g., with appropriate decoding). Alternatively, the tag can have no standard operating protocol, and work only in a CDMA mode.

Figure 2:
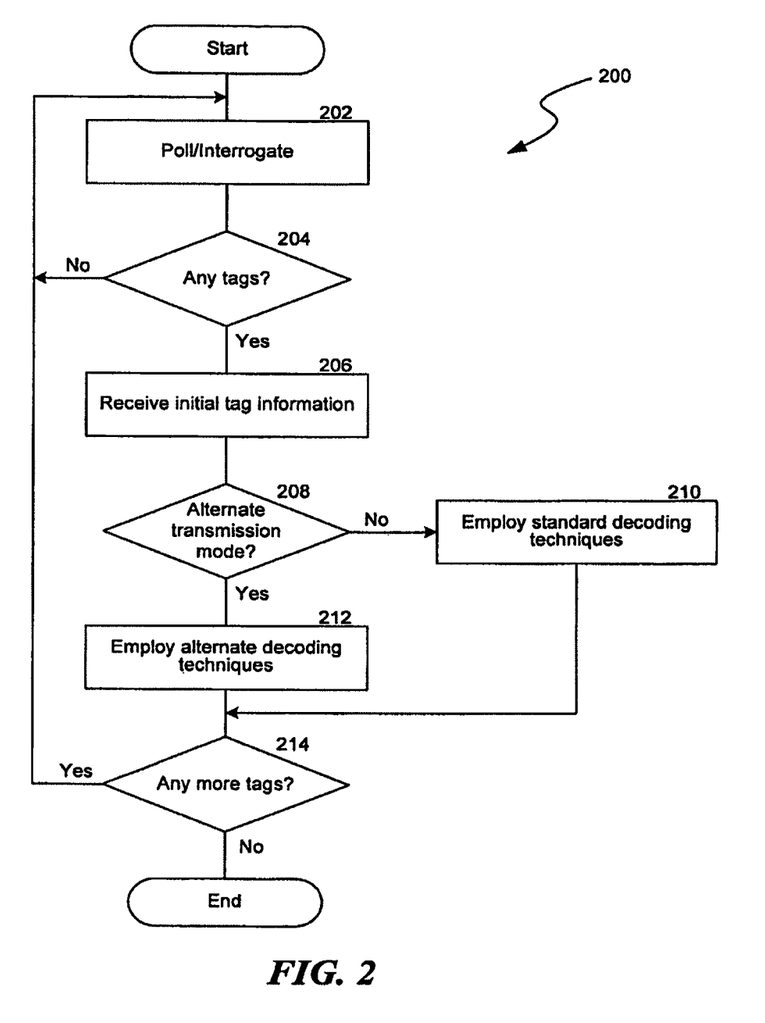
FIG. 2 is a flow diagram illustrating an example of a routine performed by the reader for reading the RFID tag of FIG. 1.

Referring to FIG. 2, an example of a routine 200 stored in the memory 112 of the reader 102 is shown for handling RFID tags employing two or more forms of alternate coding or modulation. The routine 200 can be created as computer-executable instructions that may be interpreted not only by the reader or other specialized device, but also a general-purpose computer. The routine may be not only stored in the memory 122, but also stored and distributed on computer-readable media, including magnetically or optically readable computer disks, hard-wired or preprogrammed chips (e.g., EEPROM semiconductor chips), nanotechnology memory, biological memory, or any other data storage media. Indeed, computer implemented instructions, and other aspects of the invention may be distributed over the Internet or over other networks (including wireless networks), or on a propagated signal on a propagation medium (e.g., an electromagnetic wave, sound wave, etc.) over a period of time, or they may be provided on any analog or digital network (packet switched, circuit switched, or other scheme). Thus, aspects of the routine may be not necessarily performed on a single device (e.g., the reader), but be distributed among two or more networked devices.

Beginning in block 202, the reader 102 polls or interrogates an area to identify any nearby RFID tags. If any tags are present (block 204), then the reader receives some initial information from the tag (e.g., a flag or header data), such as the tag 100 (block 206). The reader then determines from this initial information whether the tag is capable of any alternate transmission mode (block 208), and if not, employs standard decoding techniques known in the RFID field (block 210).

However, if the tag employs an alternate transmission mode, then the reader may employ alternate decoding techniques, such as the CDMA communication techniques as well as associated functions, such as Viterbi decoding, maximum likelihood detecting functions, etc., as described herein (block 212). As noted above, the tags may be relatively unsophisticated relative to the reader, which may employ much more sophisticated and complex processing for signal acquisition and decoding. If any more tags are present (block 214), then the process loops back to block 202, otherwise, the process ends.

Figure 3:
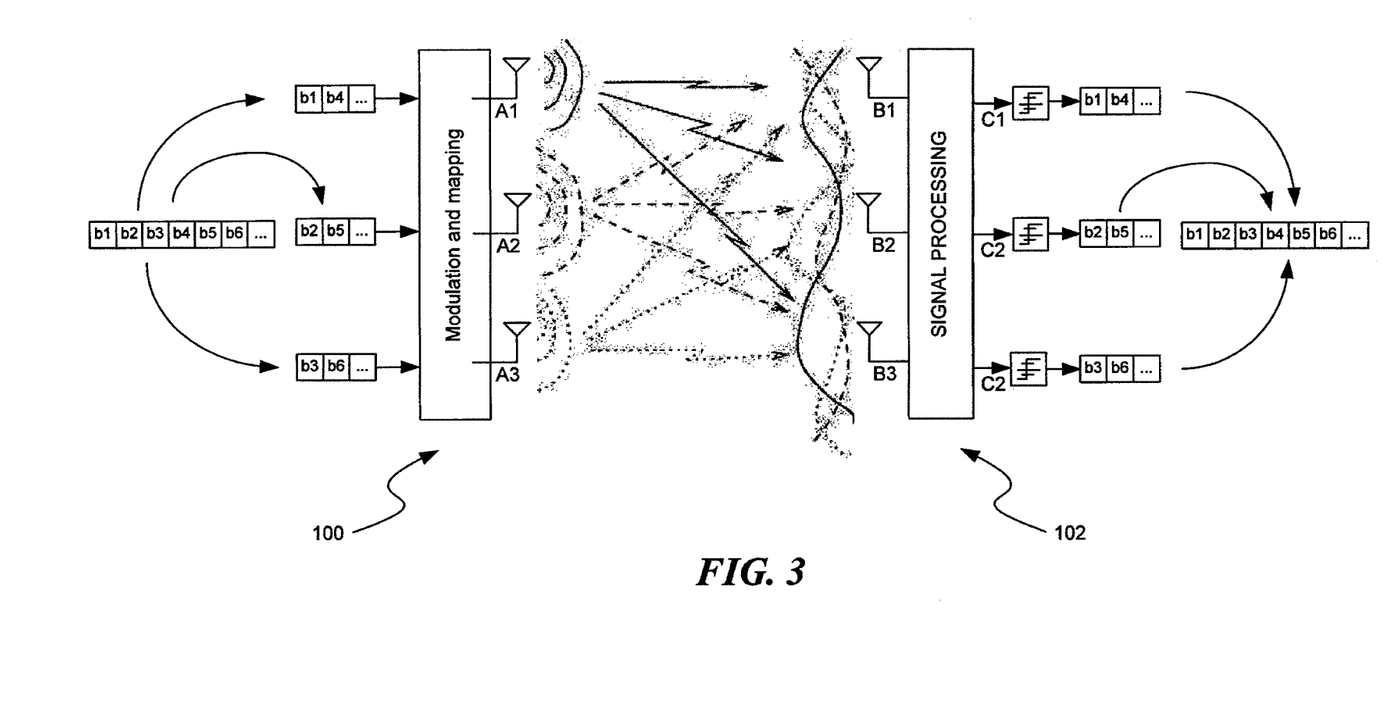
FIG. 3 is showing a general view of MIMO communication between RFID tag and reader.

Importantly, by using COMA communication techniques, the reader may simultaneously, or substantially simultaneously, read multiple tags. An approach to further boost the communication rate between the RFID tag and the reader is to employ multiple-transmit and multiple-receive antennas, i.e., multiple-input multiple-output (MIMO) techniques. FIG. 3 shows an example of such a MIMO alternative. As shown in this example, both the tag and the reader have three antennas each. Alternative embodiments may include more or less antennas for each component.

The MIMO system with $N_T$ transmitting antennas and $N_R$ receiving antennas may be described as follow:

$$r(t)=Gs(t)+n(t), \tag{1}$$

where r(t) is a $(N_R,1)$ vector of received signal; G is a $(N_T,N_R)$ channel transfer matrix; n(t) is a $(N_R,1)$ vector describing noise and interference; and s(t) is a $(N_T,1)$ vector or transmitted signal. For an RFID tag with two antennas and a reader with two antennas, (1) will be in the form of $$\left\|\begin{matrix}r_1\\r_2\end{matrix}\right\| = \left\|\begin{matrix}g_{11} & g_{1,2}\\g_{21} & g_{22}\end{matrix}\right\| \left\|\begin{matrix}s_1\\s_2\end{matrix}\right\| + \left\|\begin{matrix}n_1\\n_2\end{matrix}\right\|$$

Since RFID tags (active or passive) are typically designed to be relatively simple and inexpensive devices, their processing capability should also be limited. Implementation of CDMA paradigm for communication between a RFID tag and a reader may provide substantial increase in the capacity of the exploited frequency band and good interference suppression (especially from narrowband interference).

Figure 4:
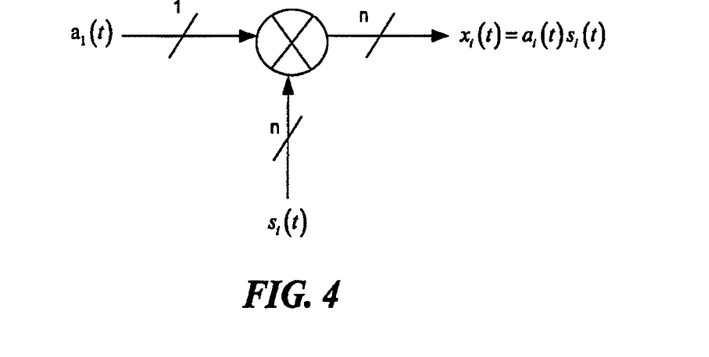
FIG. 4 is showing a general view of Code Division Multiple Access ("CDMA") paradigm.

Since RFID tags are communicating with readers in close proximity, the communication channels are slow frequency-selective fading channels. In general terms, the Code Division Multiple Access (CDMA) or Code Division Multiplexing (CDM) paradigm may be presented as follows. Referring to FIG. 4, an information signal $a_i(t)$ with period T is combined with a spreading sequence $s_i(t)$ having a chip period T/N, where N is a spreading factor, $$\|s_i\|^2 = \int_0^T |s_i(t)|^2 dt = 1.$$

Figure 5:
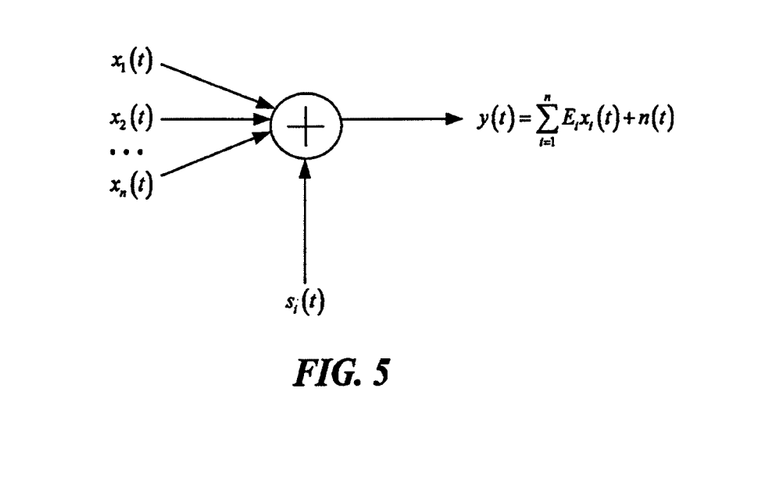
FIG. 5 is showing a general view of the CDMA communication model.

The CDMA communication model may be presented as follows, see FIG. 5, where $E_i$ is an amplitude of an $i^{th}$ information signal, and n(t) represents channel noise.

The spreading sequence may be selected from any of the following:
  Pseudo-noise or m-sequences;
  Gold codes;
  Kasami sequences;
  Walsh codes;
  Other known spreading sequences/codes.

Some desired properties of spreading sequences that may be achieved are as follows:
  Good correlation properties;
  Narrow zero-delay peak;
  Low nonzero-delay values;
  Low cross-correlation with other codes;
  A family of sequences that is sufficiently large.

Figure 6:
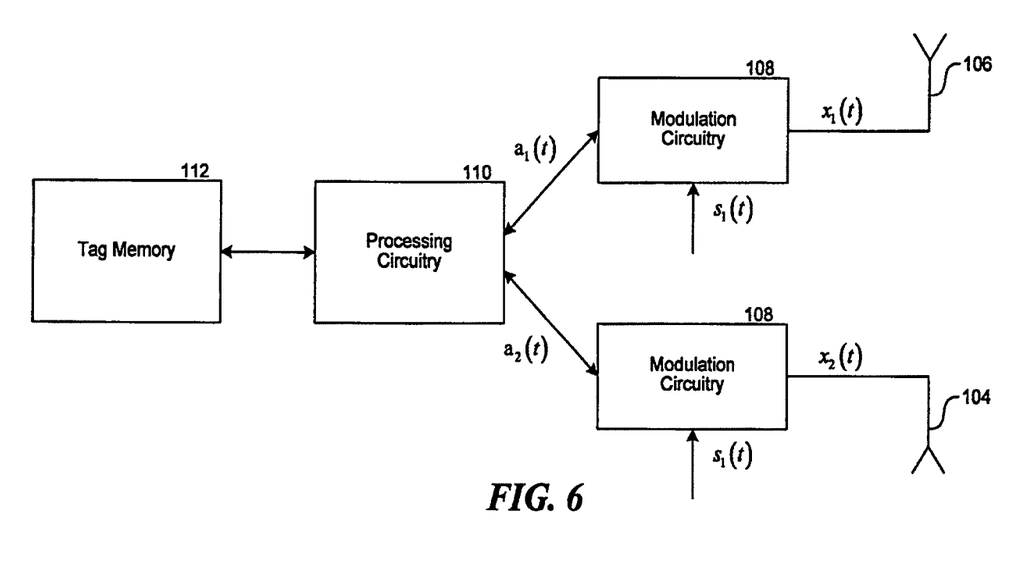
FIG. 6 is showing a general view of RFID tag implementing a parallel transmission of independent CDMA sequences from two tag antennas.

Aspects of the present invention contemplate a parallel transmission of independent CDMA sequences $x_i(t)$ from each tag's antenna or antennas. For example, in the case of two antennas on a single tag, the block diagram of the communication is shown on FIG. 6. While the same spreading code is shown as being applied to each of the two transmit channels, the tag could apply a different code to each channel.

Since a single tag's antenna(s) are generally located in very close proximity, there is no need to implement a power control scheme for communication of a single tag with the reader. In the case of parallel communications of multiple tags with a reader, a power control scheme may be required. With multiple passive tags all located in close proximity to each other, a power control scheme may not be required (where a sophisticated reader is employed), since most passive tags have low transmission power. However, with spatially distributed tags, as well as with higher transmit power of active tags, a simple power control scheme may be employed, coordinated by the reader, to moderate transmit power of individual tags during reading sequences.

A benefit of CDMA is the inherent security when using orthogonal or other codes. By employing a sufficiently large code set, data within each tag can be sufficiently secure against tapping or eavesdropping, assuming that the code is not known outside of the authorized user. Indeed, the reader can employ security techniques so that access to the codes is inhibited, such as through the use of smart cards, SIMs and other tamper-resistant memory devices having onboard processing capabilities. Of course, encryption or other security techniques may also be employed.

While the system is generally described above as employing DSSS techniques, and alternative system may use frequency hopping spread spectrum (FHSS), where the tags/reader use appropriate hopping sequences. A drawback for FHSS is that it requires greater complexity at the tag.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C §112, sixth paragraph, other aspects may likewise be embodied as a means-plus-function claim. (Any claims intended to be treated under 35 U.S.C. §112, sixth paragraph will begin with the words "means for".) Accordingly, the inventors reserve the right to add additional claims after filing the application to pursue such additional claim forms for other aspects of the invention.

What is claimed is:

1. An RFID tag, comprising:
   at least one antenna comprising at least a first antenna and a second antenna;
   a memory storing at least one orthogonal code; and
   a digital circuitry coupled with the at least one antenna and memory, the digital circuitry:
   receiving data stored in the memory;
   generating an initial protocol communication based on the data stored in memory, wherein the initial protocol communication is not CMDA encoded but indicates that the RFID tag is capable of code division multiple access (CDMA) communication,
   directing the at least one antenna to transmit the non-CDMA encoded initial protocol communication to an RFID reader;
   encoding the stored data using the at least one orthogonal code to produce a first CDMA encoded signal and a second CDMA encoded signal, at least one of which indicates that the RFID tag is capable of CDMA communications,
   after transmitting the non-CDMA encoded initial protocol communication to the RFID reader, directing the first antenna to transmit the first CDMA encoded signal and direct the second antenna to transmit the second CDMA encoded signal;
   transmitting, from the at least one antenna, the first and second CDMA-encoded signals.

2. The RFID tag of claim 1 wherein the first and second antennas are independent from each other.

3. The RFID tag of claim 1 wherein the RFID tag is a passive tag.

4. The RFID tag of claim 1 wherein the digital circuitry receives and processes CDMA encoded signals.

5. A semiconductor device for use in an RFID tag, the device comprising:
   a processor that receives incoming data stored by the RFID tag and generates an initial protocol communication based on the stored data, the initial protocol communication indicating that the RFID tag is capable of spread spectrum communication; and
   an encoder that receives the incoming data stored by the RFID tag and converts the stored RFID data into at least two different spread spectrum signals using a pseudo-random code; and
   an output portion configured to output the RFID tag data as the at least two spread spectrum signals spread using the pseudo-random code,
   wherein the RFID tag data is transmitted in parallel by the RFID tag through at least two transmitting antennas as a single sequentially partitioned signal such that communication speed is increased between the RFID tag and an RFID tag reader as compared to communication speed between the RFID tag and the RFID tag reader if the RFID tag data was not encoded using the two different spread spectrum signals using the pseudo-random code.

6. The semiconductor device for use with an RFID tag of claim 5 wherein the pseudo-random code is an orthogonal code.

7. The semiconductor device for use with an RFID tag of claim 5 wherein the pseudo-random code is a chipping sequence.

8. The semiconductor device for use with an RFID tag of claim 5 wherein the pseudo-random code is a frequency hopping code.

9. The semiconductor device for use with an RFID tag of claim 5 wherein the RFID tag comprises at least two transmitting antennas, and wherein the at least two transmitting antennas are spatially separated.

10. The semiconductor device for use with an RFID tag of claim 5, further comprising memory, coupled to the encoder circuitry, for storing the RFID tag data and the pseudo-random code.

11. A non-transitory computer-readable medium whose contents cause at least one RFID reader to perform a method for decoding data received from an RFID tag, the method comprising:
    receiving initial data from the RFID tag wherein the initial data is non-CDM encoded but indicates that the RFID tag is capable of CDM communication;
    determining that CDM communications are possible based on the initial data;
    entering a CDM mode if the CDM encoded communications are determined to be possible;
    after determining that CDM encoded communications are possible:
      receiving additional RFID tag data from the RFID tag that is encoded into at least two CDM encoded sequences, wherein the receiving comprises (1) receiving the RFID tag data encoded into a first of the at least two CDM encoded sequences via a first antenna, and (2) receiving the RFID tag data encoded into a second of the at least two CDM encoded sequences via a second antenna, and
      decoding the additional RFID tag data; and
    outputting the decoded RFID tag data.

12. The computer-readable medium of claim 11 wherein the method further comprises:
    receiving an operating protocol communication via a non-CDM encoded protocol, the operating protocol communication indicating that the RFID tag is capable of spread spectrum communication.

13. The computer-readable medium of claim 11 wherein the RFID tag comprises the first and second antennas for transmitting the CDMA encoded signal.

14. The computer-readable medium of claim 11 wherein the RFID tag is a passive tag.

15. The RFID tag of claim 1,
    further comprising a substrate,
    wherein the first CDMA encoded signal is different than the second CDMA encoded signal, and
    wherein the first CDMA encoded signal and the second CDMA encoded signal together comprise a single sequentially partitioned message.

16. The computer-readable medium of claim 11,
    wherein the first of the at least two CDM encoded sequences and the second of the at least two CDM encoded sequences together comprise a single sequentially partitioned message.

* * * * *